United States Patent [19]
Sciaky

[11] 3,835,291  
[45] Sept. 10, 1974

[54] ELECTRON BEAM WELDING MACHINE WITH SPLIT SEAL MEANS

[75] Inventor: David Sciaky, Chicago, Ill.

[73] Assignee: Welding Research, Inc., Chigago, Ill.

[22] Filed: Feb. 16, 1973

[21] Appl. No.: 332,915

[52] U.S. Cl............................ 219/121 EB, 160/180
[51] Int. Cl............................................ B23k 15/00
[58] Field of Search........ 219/121 EB, 121 EM, 72; 49/477, 34; 160/180; 34/242; 292/307

[56] References Cited
UNITED STATES PATENTS

| | | | |
|---|---|---|---|
| 2,651,359 | 9/1953 | Margison | 160/180 |
| 2,667,751 | 2/1954 | Osborn | 219/72 UX |
| 3,192,301 | 6/1965 | Sterzl | 219/121 EB X |
| 3,483,351 | 12/1969 | Wood | 219/121 EB |
| 3,493,711 | 2/1970 | Terselic et al. | 219/72 |

Primary Examiner—J. V. Truhe  
Assistant Examiner—G. R. Peterson

[57] ABSTRACT

A sealing device for sealing cylindrical objects passing through a wall of a vacuum chamber and which are to be rotated about their longitudinal axes comprising a two part annular resilient seal separable along a plane passing through a diameter of the seal. The parts are installed one on each section of a wall of the chamber which has been split into two parts which may be moved in relation to one another so that when the wall sections are separated the seal parts are separated and the inside of the vacuum chamber is accessible so that the cylindrical objects may be positioned part inside the chamber and the remainder extending outside the chamber. When the wall sections are brought to the closed position the seal parts meet along the plane and surround the cylinder so as to form an effective vacuum seal between wall and cylinder. Means are provided in the resilient seal for preventing leakage of air into the chamber along the interface between the two seal parts when the cylindrical objects are in rotation.

8 Claims, 7 Drawing Figures

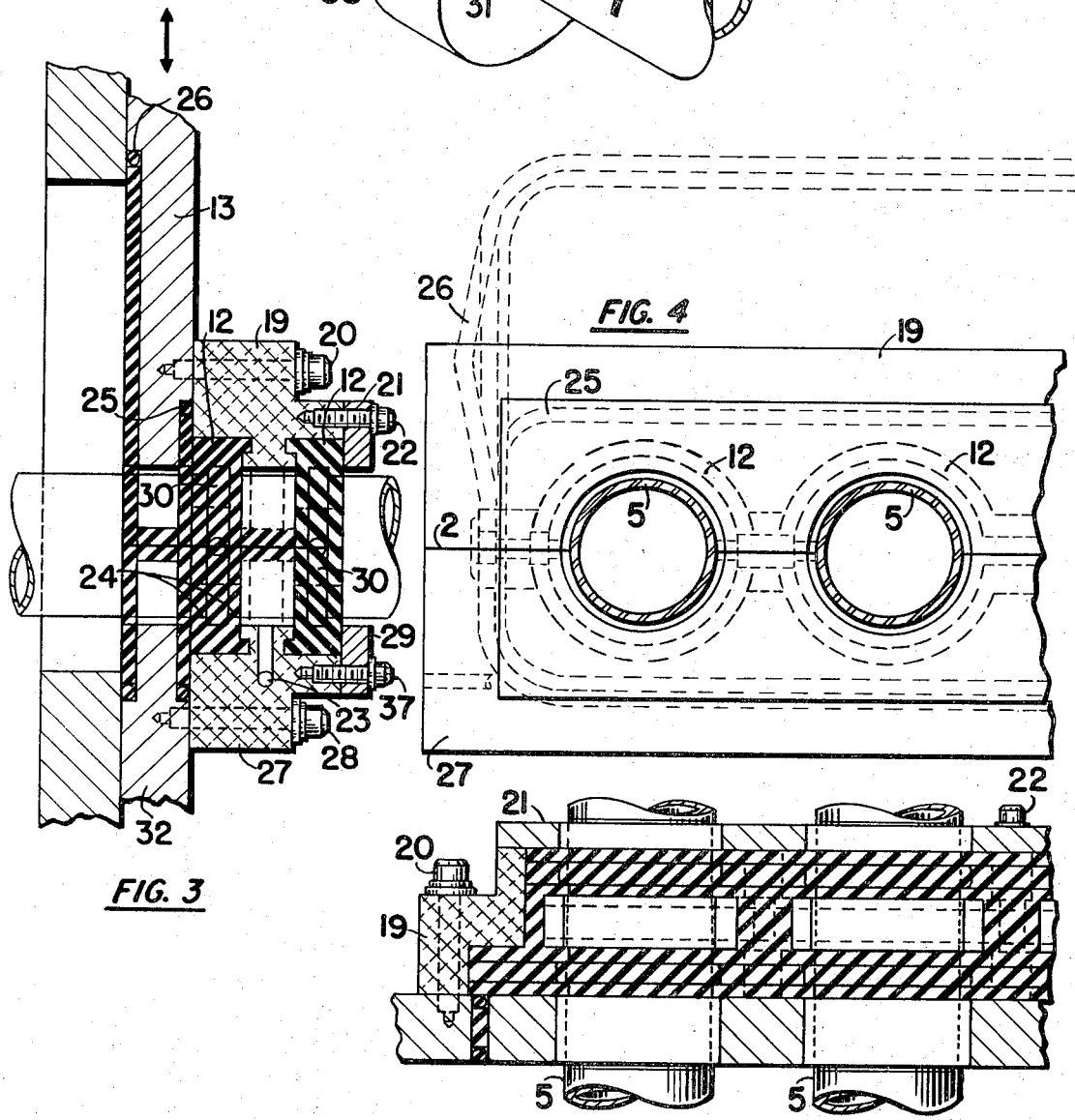

ELECTRON BEAM WELDING MACHINE WITH SPLIT SEAL MEANS

This invention relates to electron beam welding machines and, in particular, to an electron beam welding machine which includes means whereby the ends of tubes may be introduced into the welding chamber through split annular seals mounted on one of the walls of the chamber. The seals are constructed in such a way that when the two halves of the split seal are properly positioned around the tubing the tubing may be rotated about its longitudinal axis so as to effect a relative motion between an electron gun mounted within the chamber and the tube.

In the past whenever it has been necessary to weld flanges or other fittings to tubes by means of an electron beam, it has been necessary to place the entire tube inside a vacuum chamber. The tubing is supported between a head and a tailstock within the chamber and rotated within the chamber by means of a suitable gear train driven by an electric motor. If the tubing to be welded was 30 feet in length it would be necessary to build a 30 foot long chamber thus necessitating a great expenditure in the design and manufacture of such a chamber. Because of the relatively great volume within the chamber large vacuum pumps would have to be utilized in order to evacuate the chamber in a reasonable length of time. A first attempt at simplifying and making smaller the vacuum system required was to insert a sealed plug at one end of the tubing and provide one wall of the vacuum chamber with an orifice to which was fitted an annular inflatable seal through which the tubing was inserted into the vacuum chamber while the seal was deflated. When the seal was inflated an effective seal was provided around the surface of the tubing in contact with the seal so that the vacuum chamber could be pumped down with a much smaller pump than the one required for the first case above. Because the tubing could not be turned when held by the inflated seal, it was necessary to provide a means for rotating the electron beam gun over more than 360° in order to effect a weld around the circumference of the tubing and allow for a small overlap of the weld. This required an elaborate mechanism for supporting and driving the electron beam gun with space in the chamber necessary to allow for the rotation not only of the gun but of the large high voltage cables which are necessary to carry the electrical current at voltages which may be as high as 150,000 to the several electrodes in the gun.

The present invention is directed to a system which overcomes the inconveniences and disadvantages of the old system.

The present invention has as an object the capability of introducing the ends of tubing to which various fittings are to be welded circumferentially into an electron beam welding chamber in such a way that the tubing may be rotated about its longitudinal axis from a drive located outside the chamber walls.

Another object is to provide an effective sealing means between the outer surface of the tube and the chamber wall through which the end of the tubing is inserted into the vacuum chamber.

Another object is to provide a flexible sealing means made of two semi-annular parts which are separable.

A further objective is to provide a means for quickly introducing the ends of tubing into a vacuum chamber and circumferentially sealing the tube to the wall of the vacuum chamber so as to prevent the leakage of air into the chamber.

Another object is to provide an electron beam welding machine which requires a vacuum chamber of minimum size and a minimum of vacuum pumping equipment in order to reduce the pressure within the chamber to the pressure required for electron beam welding.

The invention may be described by referring to the figures which illustrate one embodiment of the invention.

FIGS. 3, 4 and 5 are views of a practical embodiment of the invention as installed on a wall of a vacuum chamber.

FIG. 7 is a perspective in partial section of the split sliding seal means.

One of the first uses to which the electron beam process has been applied, has been the welding of end caps to tubular fuel element cells for use in nuclear reactors. Heretofore machines for welding such elements have been provided with fixtures which could accommodate several tubes on a rotatable fixture which was installed inside the vacuum chamber or in a separate chamber which could be pre-loaded and attached to the welding chamber. Because of the great length of some of the fuel elements the chamber to contain these elements and fixtures supporting them was quite large and required a lengthy pump-down period through the use of rather large mechanical and diffusion type pumps which brought the pressure within the chamber to from $10^{-4}$ to $10^{-5}$ Torr as required for welding.

Figure 2:
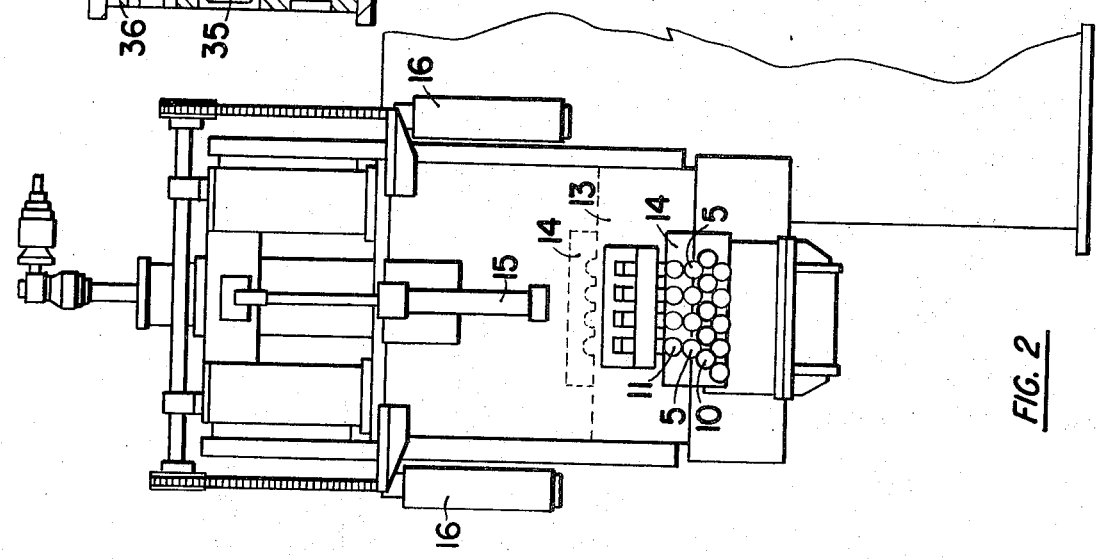
FIG. 2 is a front elevation of the machine.
Figure 1:
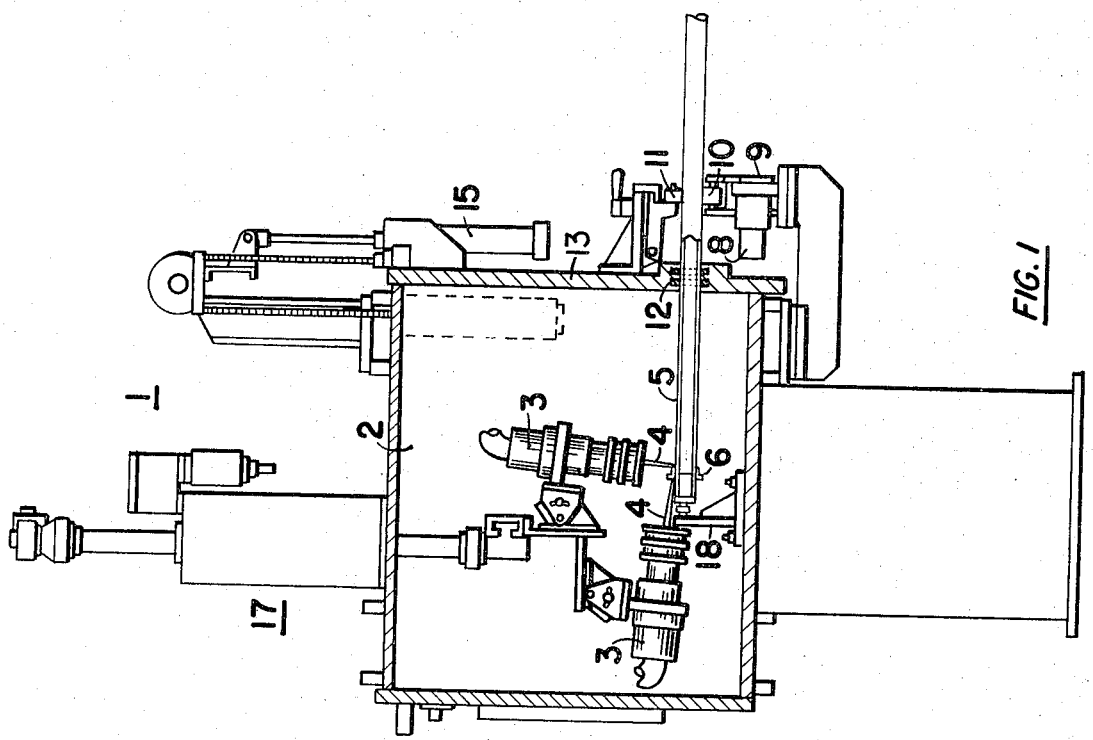
FIG. 1 is a side elevation in section of a machine which incorporates the invention.

FIGS. 1 and 2 are side and front elevations in partial section of an electron beam welding machine which incorporates the present invention. Through the use of a novel split sealing means of the present invention the welding machine vacuum chamber has been reduced in size to a minimum since the vacuum chamber is required only to enclose the electron gun or guns and the means for supporting one end of the tubes within the vacuum chamber. The major portion of the tubing whose length may be 30 feet or more remains outside the chamber in the atmosphere and needs only be supported at intervals by simple stands incorporating roller means upon which the tubing may rest.

FIG. 1, a side elevation and partial section, illustrates an electron beam welding machine (1) which comprises a vacuum chamber (2) which may be evacuated to the welding pressure of $10^{-4}$ to $10^{-5}$ Torr by suitable mechanical and diffusion pumps whose size will depend upon the desired pump down time. Within the chamber are shown electron guns (3) which may be moved within the chamber by means of a gun drive mechanism (17) mounted outside the chamber which is provided with an operating arm which carries the guns and through which any desired degree of motion may be imparted to the guns in order to position the gun with respect to the workpiece. The right hand wall of the vacuum chamber is provided with a resilient annular seal (12) which is split in two along its diameter which lies in a horizontal plane. The lower portion of the seal is mounted to the upper section of the wall which is slideable vertically so that when lifted an opening is provided for access to the interior of the chamber. The tubing to be welded (5) is shown in place supported at its end by fixture (18) inside the chamber. Prior to installation into the chamber the tube (5) is provided with a sealed plug (32), FIG. 6, which is inserted inside the tubing so as to prevent air from entering through the tubing into the vacuum chamber (2). The tubing (5) is sealed by means of the flexible seal (12) when the upper part of the wall (13) is brought down over the tube or tubing to be welded and an air tight seal formed between a section of the wall (13) and the tube. The annular flanged part (6) which is to be welded to the tubing (5) is shown in place ready for welding. During the welding operation the tubing (5) is driven by means of friction drive rollers (10) which are driven by means of a gear train (9) and drive motor (8). Back up pressure rolls (11) are provided to hold the tube in position during the welding operation. The electron beams (4) from each of the two guns in this particular case make two circumferential welds where the beams strike the work. When the welding operation is completed the vacuum pumps are valved off from the chamber, air is introduced into the chamber to bring it to atmospheric pressure and the movable wall supporting the upper part of the split flexible seal is lifted by means of pneumatic cylinder (15) to the position indicated by the dotted lines shown at (14) of FIG. 2 which delineate the upper position for the sliding wall of the chamber. Balancing weights (16) which allow the sliding wall to be held at any level are provided. The tubing (5) may then be removed from the chamber and the next set of tubes to be welded put into place. In the machine illustrated four tubes may be installed in the machine at one time. The flanges may be welded to the tubes in succession by moving the guns horizontally from one tube to the next as each weld is completed.

FIGS. 3, 4 and 5 are the side front and top views of a pratical embodiment of the invention for a split seal designed to accommodate four tubes to be welded with one pump down operation. In this embodiment of the invention two sealing structures are utilized, one behind the ohher along the tubing. The seals for four tubes are molded in one piece so that four split seals are formed at once. The seals are supported by seal support (19) which carries the upper half of the seals (12) and seal support (27) which carries the lower mating half of the seals (12). Seal support (27) is fastened to the stationary portion of the wall (32) by bolts (28) and seal support (19) carrying the upper half of the seals is fastened to the sliding portion of wall (13) by means of bolts (20). The ends of the seals (12) at the left are firmly in contact with the outer surface of wall (13) and retainer plates (21) and (29) are fastened by bolts (22) and (37) respectively, and serve to maintain the right side of the seal in position.

When the seal plate (19) is in position over the tubes (5) to be welded two surfaces (24) on each of the seals (12) are intimately in contact with and encircle the tube 5. The flat mating surfaces of each half of the seals (12) are pressed together when the upper seal plate (19) is brought down over the lower seal plate (27). An O-ring seal (26) which is separated in the horizontal plane containing the line 2 becomes a continuous seal when the movable portion of the wall (13) is in the lower position. In this position the several seals effectively prevent the passage of air from outside the chamber into the chamber along the surface of the tubing or between the sliding and fixed walls of the chamber. When the seal halves are properly mated an annular space 30 is formed between the seal (12) and the outer surface of the tubing (5). Prior to placing the tubes in position this annular groove in the seal (12) is filled with a suitable lubricant and the surface of the tube in the vicinity of the sealing surfaces is also buttered with lubricant so as to reduce the friction between the flexible seal and the tube which is to be rotated within the seal.

Figure 6:
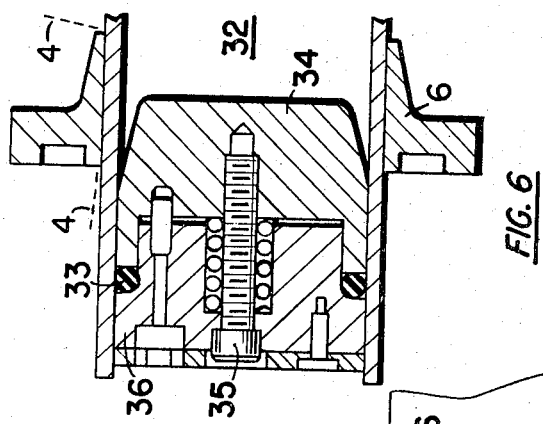
FIG. 6 shows means for sealing the inside of the tube to be welded.

FIG. 6 is a detail of the plug which is inserted into the end of the tube to be welded so as to prevent air leakage into the chamber through the tube. The sealing plug consists of a cylindrical body (36) which is fitted with an annular O-ring flexible seal 33 which fits in a reduced section machined at a section of the outer surface of the cylinder 36. A second cylinder member 34 is machined with an annular section which is slideable over the reduced portion of the main body (36).

The screw (35) when turned clockwise causes part (34) to move towards part (36). The edge of the annular machined portion of 34 squeezes O-ring 33 and causes it to expand radially and so provide a tight seal against leakage of air into the chamber along the inner wall of the tube. The flange (6) is shown in position around the tube.

FIG. 7 is a perspective drawing partially in phantom showing the unique construction of the seal. When a tube which is surrounded by a split seal is rotated it is soon found that the lips 31 where the seal is split will separate from the adjacent seal surface so that a passageway will be formed from one side of the seal to the other through which air may enter the vacuum chamber. In order to overcome this inconvenience which would render the seal completely ineffective to prevent leakage into the chamber a small cylinder (38) of the material from which the seal is fabricated is fastened with adhesive to the trailing end of each half of the seal so that it projects above the mating surface of that half. During rotation of the part (5) this small cylinder which bears against the tube cannot lift away from the lower half of the seal inasmuch as it is fastened to it. Although the lip 31 of the upper half of the seal lifts away from its mating surface on the lower half of the seal the small cylinder being resilient expands sideways and maintains the seal so that no leakage occurs from one side of the seal to the other into the chamber. The cylinder 38 may also be molded as an integral part of the seal and take the form of a projection of semicircular, rectangular or other cross sectional shape on one part of the seal which would mate with a like shaped groove in the other part of the seal.

As illustrated in FIG. 3, two sealing structures (12) are utilized on each tube making a total of four sealing areas along the surface of the tube. The space between each pair of sealing areas is provided with means for pumping between the seals by a passageway (23) which is connected to a mechanical vacuum pump. Although FIG. 1 shows the split seal means installed on one wall of the vacuum chamber a second such seal may be installed in the opposite wall in case one desires to make a weld elsewhere than the end of a tube and where the tube would pass through and be sealed at both walls of the chamber.

Although a specific form of the invention has been illustrated other modifications which do not depart from the invention may be apparent to the skilled man of the art.

What I claim is:

1. A device for preventing gas leakage between the surface of a cylinder rotatable about its longitudinal axis and an opening in a wall of a vacuum chamber through which the said cylinder passes, comprising
    an annular resilient seal split along its diameter in a plane passing through the longitudinal axis of said cylinder and separable into two semi-circular parts;
    an annular groove formed on the inner surface of the said seal so as to form two cylindrical bands on its inner surface separated by said groove;
    a raised portion above the said plane which extends radially along one end of each of said semi-circular parts, from the inner surface of the seal to its outer periphery;
    and a groove having the same dimensions as the said raised portion formed below said plane on the other end of each of said parts — the said raised portion of one separable part interlocking with the radially grooved portion of the other part of the seal.

2. A sealing device as in claim 1 in which the said raised portion is semi-circular in cross section.

3. A sealing device as in claim 1 including means to prevent rotation of the said seal with respect to the chamber walls and means to prevent leakage between seal and chamber walls.

4. A sealing device incorporating a multiplicity of the seals described in claim 1.

5. A device as in claim 1 in which the said parts are mounted in an opening on the wall of a vacuum chamber which is split into two parts along a line which lies in the aforementioned plane, the said wall parts movable one with respect to the other in their common plane in a direction perpendicular to the said line of split so as to separate at least one seal part from the aforementioned tube and to give access to the interior of the vacuum chamber.

6. A sealing device as in claim 5 in which the said wall is the wall of an electron beam welding machine vacuum chamber.

7. A sealing device as in claim 5 installed on a wall of an electron beam welding machine which includes means for rotating the said cylindrical objects about their longitudinal axis.

8. A sealing device as in claim 5 installed on a wall of an electron beam welding machine which includes means for rotating the said cylindrical objects about their longitudinal axis from outside the said chamber.

* * * * *